United States Patent
Downey et al.

(10) Patent No.: US 12,267,625 B2
(45) Date of Patent: *Apr. 1, 2025

(54) VERIFYING AND ENCOURAGING ASSET CONSUMPTION IN A COMMUNICATIONS NETWORK

(71) Applicant: INVIDI Technologies Corporation, Princeton, NJ (US)

(72) Inventors: David Downey, Sherman, CT (US); Bruce J. Anderson, Chesterfield, NJ (US); Daniel C. Wilson, Edmonton (CA)

(73) Assignee: INVIDI Technologies Corporation, Princeton, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/370,754

(22) Filed: Sep. 20, 2023

(65) Prior Publication Data

US 2024/0305748 A1 Sep. 12, 2024

Related U.S. Application Data

(63) Continuation of application No. 16/025,766, filed on Jul. 2, 2018, now Pat. No. 11,800,061, which is a
(Continued)

(51) Int. Cl.
*H04N 21/2543* (2011.01)
*H04N 7/173* (2011.01)
(Continued)

(52) U.S. Cl.
CPC ..... *H04N 7/17318* (2013.01); *H04N 21/2543* (2013.01); *H04N 21/44224* (2020.08);
(Continued)

(58) Field of Classification Search
CPC ......... H04N 7/17318; H04N 21/44224; H04N 21/2543; H04N 21/47202; H04N 21/6582; H04N 21/812
See application file for complete search history.

(56) References Cited

U.S. PATENT DOCUMENTS

| 5,978,013 A | 11/1999 | Jones et al. |
| 7,043,746 B2 | 5/2006 | Ma |

(Continued)

FOREIGN PATENT DOCUMENTS

| KR | 10-2007-0024039 A | 3/2007 |
| KR | 10-2007-0061601 A | 6/2007 |
| WO | 200165747 A1 | 9/2001 |

OTHER PUBLICATIONS

International Search Report and Written Opinion, PCT/US2009/044395, dated Dec. 28, 2009, Korean Intellectual Property Office, 9 pages.

*Primary Examiner* — Kyu Chae
(74) *Attorney, Agent, or Firm* — Davis Graham & Stubbs LLP

(57) ABSTRACT

Systems and methods presented herein generally provide for the compensation of asset providers and/or communications network providers for the non-consumption of assets provided with programming. In this regard, when users elect not to consume the assets associated with the programming, the asset provider loses the opportunity to present their assets to such non-consuming users and is thereby injured in relation to the price they have paid for the delivery of their assets. In one arrangement, a reporting module at a customer device is operative to identify when a user skips an asset and report that skip event to the network. This information may then be utilized to adjust the bill of the asset provider and/or to bill the user associated with the skip event.

20 Claims, 10 Drawing Sheets

Related U.S. Application Data continuation of application No. 12/024,714, filed on Feb. 1, 2008, now abandoned.

(60) Provisional application No. 60/887,750, filed on Feb. 1, 2007.

(51) Int. Cl.
    *H04N 21/442*     (2011.01)
    *H04N 21/472*     (2011.01)
    *H04N 21/658*     (2011.01)
    *H04N 21/81*     (2011.01)

(52) U.S. Cl.
    CPC ... *H04N 21/47202* (2013.01); *H04N 21/6582* (2013.01); *H04N 21/812* (2013.01)

(56) References Cited

U.S. PATENT DOCUMENTS

| | | |
|---|---|---|
| 7,111,314 B2 | 9/2006 | Urdang |
| 7,440,674 B2 | 10/2008 | Plotnick |
| 7,484,656 B2 | 2/2009 | McLean et al. |
| 7,720,351 B2 | 5/2010 | Levitan |
| 7,806,329 B2 | 10/2010 | Dmitriev et al. |
| 7,813,954 B1 | 10/2010 | Price et al. |
| 7,827,585 B2 | 11/2010 | Hassell |
| 7,962,943 B2 | 6/2011 | Nakagawa et al. |
| 8,065,696 B2 | 11/2011 | Scott, III et al. |
| 8,185,923 B2 | 5/2012 | Slaney et al. |
| 8,266,659 B2 | 9/2012 | Urdang et al. |
| 8,341,527 B2 | 12/2012 | Gupte |
| 8,813,118 B2 | 8/2014 | Bhatnagar |
| 8,875,207 B2 | 10/2014 | Weintraub |
| 8,930,990 B2 | 1/2015 | Slaney |
| 11,800,061 B2 * | 10/2023 | Downey ............ H04N 21/6582 |
| 2002/0049966 A1 | 4/2002 | Wilson |
| 2002/0104083 A1 | 8/2002 | Hendricks et al. |
| 2002/0120927 A1 | 8/2002 | Harada et al. |
| 2003/0149975 A1 | 8/2003 | Eldering et al. |
| 2004/0003404 A1 | 1/2004 | Boston et al. |
| 2004/0049779 A1 | 3/2004 | Sjoblom |
| 2005/0015803 A1 | 1/2005 | Macrae et al. |
| 2005/0177861 A1 * | 8/2005 | Ma ..................... H04N 21/4349 |
| | | 348/E5.103 |
| 2007/0076384 A1 | 4/2007 | Shin |
| 2007/0288951 A1 | 12/2007 | Ray et al. |
| 2008/0092158 A1 * | 4/2008 | Bhatnagar .......... H04N 21/4722 |
| | | 348/E7.071 |
| 2008/0127249 A1 | 5/2008 | Cruice |
| 2010/0242063 A1 * | 9/2010 | Slaney ................ H04N 21/458 |
| | | 725/32 |
| 2011/0179435 A1 * | 7/2011 | Cordray ........... H04N 21/44224 |
| | | 725/9 |

\* cited by examiner
VERIFYING AND ENCOURAGING ASSET CONSUMPTION IN A COMMUNICATIONS NETWORK

CROSS-REFERENCE TO RELATED APPLICATIONS

This application is a continuation of U.S. application Ser. No. 16/025,766, entitled "VERIFYING AND ENCOURAGING ASSET CONSUMPTION IN A COMMUNICATIONS NETWORK," filed on Jul. 2, 2018, which is a continuation of U.S. application Ser. No. 12/024,714, entitled "VERIFYING AND ENCOURAGING ASSET CONSUMPTION IN A COMMUNICATIONS NETWORK," filed on Feb. 1, 2008, which is a non-provisional of U.S. Provisional Application No. 60/887,750, entitled "VERIFYING AND ENCOURAGING ASSET CONSUMPTION IN A COMMUNICATIONS NETWORK," filed on Feb. 1, 2007. The contents of the above-noted applications are incorporated by reference herein as if set forth in full and priority to this application is claimed to the full extent allowable under U.S. law and regulations.

FIELD OF INVENTION

The present invention relates generally to the distribution of assets, such as ads or other material, together with content such as programming via a network interface. More particularly, the invention relates to verifying consumption of assets by network users. Such verification allows for encouraging consumption of assets through incentives and associated consumer loyalty programs, as well as achieving a premium on asset delivery due to verified consumption. Conversely, consumption verification enables identification of events where network users skip, or elect not to consume, assets, thereby potentially impacting the revenue model of the network. Once skip events are identified, they can be accounted for in various ways. One particularly advantageous application of the invention is to verify ad consumption in networks, such as various broadcast networks including cable television networks, having assets temporally interleaved with content (e.g., ad breaks) or temporally overlapping content (e.g., product placement).

BACKGROUND

Users of communications networks, e.g., broadcast networks, data networks, etc., typically use the networks because of the desirability of obtaining content available on the networks. For example, such content may include text, audio, graphics and/or full video content. The content is provided by content providers and may be provided directly from the content providers to users via the network, or the content may be provided to the users via an intermediate network operator. In any case, content is typically developed or acquired by the content providers at significant expense, and the business models that make such networks viable generally entail some mechanism for compensating the content providers and/or network operators for making the content available.

Those business models may involve, for example, advertising revenues or user fees. In the case of ad-supported networks, advertisers pay to associate ads for their services or products with content disseminated via the network. These advertising revenues subsidize or fully cover the costs of providing the content desired by users. In fee-based networks, users directly pay to have access to the content, e.g., on a monthly or per access event basis. Some networks involve both user fees and advertising revenues. In any case, the content is not free, though it might appear so from the user's perspective.

The case of broadcast networks, such as cable television networks, is illustrative. In such networks, content or programming may be provided from a variety of sources, e.g., programming networks, local affiliates, etc. In the case of cable television networks, the content is made available to users or subscribers via network operators such as Multiple System Operators (MSOs). Some channels may be ad supported and other channels, i.e., premium channels, may be supported at least in part by additional fees paid by subscribers. In the case of ad-supported channels (and even premium channels), various forms of advertising may be employed including conventional ads temporally interleaved with programming segments and product placement ads. For example, the programming may be interrupted by a commercial break, divided into a number of ad spots. Advertisers pay to place ads into each of these spots. In the case of product placement ads, advertisers may pay to have their products or services appear or be referenced during programming.

It will be appreciated that ad skipping or tuning away from an ad (e.g., channel surfing during a commercial break), where a network user elects not to consume ads, has the potential to undermine the business model that makes ad-supported content dissemination viable. While this concern potentially applies to a variety of network environments, it has been particularly realized in relation to television networks (i.e., cable and satellite television networks) due to the increasing prevalence of digital video recorders (DVRs) and associated time-shifted viewing, as well as the common practice of tuning away during ads. In particular, it is increasingly common for users to view programming that has been previously recorded and to fast-forward through, or otherwise skip, the commercial breaks. Indeed, in some cases, this has been promoted by the manufactures of DVRs. The diminution of the audience size is a concern to advertisers and network providers and may become a concern to users who have come to expect subsidization by advertisers of the costs of making content available via communications networks. Moreover, the expectation that some unknown number of network users, to whom an asset has been broadcast, may not consume the asset, may devalue the price that asset providers will pay for asset delivery according to conventional measures.

SUMMARY

The present invention is directed to verifying and encouraging consumption of assets. Advertisers or other asset providers typically pay based on an expected or measured volume of distribution (e.g., based on a cost per thousand users or CPM) or volume of users meeting specified demographic or other criteria. This corresponds to a value per impression that can be readily calculated. This is notionally the value that is lost to an asset provider and/or network operator when an asset is not consumed. Simply knowing how many asset consumption events have occurred has value in administering a network. In addition, asset consumption can be encouraged or non-consumption accounted for in various ways.

It has been realized that many users of the communications networks prefer to receive their programming free of assets or choose not to consume assets. Nonetheless, it is believed that many users may be willing to receive and consume assets if provided a sufficient economic motivation. For example, consumers may be willing to receive and consume assets in order to receive free or reduced rate programming or other economic benefit. Other users may be willing to pay a premium to receive programming free from assets or to skip or tune away from assets. In this regard, by allowing consumers to elect to provide value by consuming the assets or by paying a premium, asset providers may be compensated (e.g., charged lower asset delivery costs) or may be refunded asset delivery fees paid up-front based on the reduction in the delivery of those assets. In the case where users elect not to consume assets, they may pay a premium equal to the above-noted value per impression, or some other amount, resulting in reduced or no impact on revenues, or even revenue enhancement. In any case, a combination of the fees paid by asset providers for the delivery of their assets, any fees charged to users who elect not to consume assets and/or enhanced revenues due to increased asset consumption and verified consumption, may allow for the continued subsidizing of the programming costs by advertisers for those users who elect to receive and consume assets with their programming.

Moreover, it has been recognized that a system for encouraging and verifying asset consumption can provide a number of other benefits. First, because it is expected that some network users will not consume assets that have been broadcast, absent the verification system of the present invention, this may be reflected in lower CPMs (or similar measures). Thus, if consumption is verified, it is expected that higher CPMs for verified consumption may be justified. The result may be improved ad effectiveness, revenue enhancement and potentially reduced subscription fees for network users.

Such a system also enables various customer loyalty programs with attendant benefits to network users, network providers and asset providers. For example, a network provider (e.g., an MSO in the case of a cable television network) may establish an account for each network user and credit a user's account some value or count in connection with verified consumption of assets. The account can then be used to reward users based on a volume and/or value of assets consumed, e.g., in the form of credits against the network user's bill, credits towards upgrades or extras (e.g., fee based services such as VOD programs), credits towards a threshold for receiving an award such as one-month of free services, or credits towards a third party or affiliate rewards program (e.g., frequent flyer miles, UPromise accounts, etc.).

Moreover, the information acquired in connection with such a system may have value for other applications. For example, the system may accumulate information regarding which network users have consumed what assets, how many consumers have elected not to consume an asset and/or what level of interest was indicated by consumers (e.g., a click stream may indicate a high likelihood that a user was present, an intentional dwelling on the asset, a muting or reduced volume for the asset, etc.). In this regard, network users may opt-in or consent to such collection of information, e.g., due to a desire to participate in an awards/loyalty program or to improve asset targeting, and may provide demographics, lifestyle, product interest or other information in an associated registration process. Such information may be used to value asset delivery, to analyze an effectiveness of an ad campaign or to better understand a target audience for an asset.

In addition, a database of such information facilitates processes by which further contacts may be made. For example, users may make requests to, e.g., asset providers and asset providers may respond. For example, in the case of a cable television network, a user viewing an ad may provide an input (e.g., by entering a specified remote control key) at or near the time of ad delivery so as to request a coupon, request further product information or indicate a willingness to be contacted by mail, email, phone or other means. Again, such inputs may be encouraged through a loyalty/rewards program. The appropriate asset provider or another party can then respond accordingly, e.g., via the broadcast network or another network. It will be appreciated in this regard that certain assets and prompts may be provided only to participating network users. For example, during a travel program, all or only participating users may receive an overlaid ad for vacation-related products or services (e.g., at the bottom of the television screen during a programming segment) or an ad during a commercial break. Additionally or alternatively, all or only participating users may receive a prompt to enter a certain remote control key for coupons or promotional information that may be related to a current subject matter of programming or an asset delivered to the user (e.g., as indicated by targeting metadata, a program guide, SAP keyword searches, etc.). These features and advantages are enabled by the various aspects of the invention as set forth below.

In accordance with one aspect of the present invention, a method and apparatus ("utility") is provided for monitoring consumption of assets transmitted in a communications network, for example, a cable television network. The utility involves: monitoring user inputs, e.g., at a user equipment device, in relation to playing of an asset; and processing information related to the user inputs to determine a consumption status of the asset. For example, the consumption status may indicate that the asset was not consumed (e.g., that a user or skipped or fast-forwarded through an ad, that an asset was only partially consumed (e.g., that a user tuned away from an ad), or that a low level of interest by the user is indicated (e.g., an ad was muted or the volume was reduced, or that there was a lack of active interest at the time of the ad due to an extended period without user inputs). Conversely, the user inputs may indicate that the asset was consumed and that active interest is indicated (e.g., an ad was played in full and/or a responsive input was received in relation to the ad).

The processing of this information may involve providing an output to a network platform. The output may identify, directly or indirectly, the network user, the ad at issue and information indicating a consumption status. In one implementation, raw information reflecting a stream of user inputs is reported to a network platform where the inputs can be analyzed in relation to stored information, concerning assets transmitted in the network, to determine what assets were consumed, whether they were consumed in full and, perhaps, what level of interest is indicated. The input stream may also be analyzed to obtain demographic or classification information regarding the user.

In another implementation, the user inputs may be processed at the user equipment device to yield processed report information for transmission to a network platform. For example, the report information may identify the user, and asset slot (e.g., programming channel and commercial break/slot) and a value indicating consumption status. For example, an asset may be deemed to be "consumed" if the user meets a defined threshold, e.g., if the user consumes the first ten seconds or at least 30% of the full asset. In this manner, the report can provide a binary consumed or not consumed indication for ease of processing. Where the invention is implemented in conjunction with a targeted advertising system, as described below, the report may also identify, directly or indirectly, the asset that was delivered (e.g., an ad identifier or an ad channel selected) and provide an estimated goodness of fit of the current viewer to the targeting parameters for the asset.

According to another aspect of the present invention, a utility is provided for identifying asset non-consumption events such as fast-forwarding through or tuning away from an asset ("skip events" or "skipping"). The utility involves identifying a user input related to an asset skipping event and associating the input with one or more asset delivery opportunities. The user input may be provided in advance or concurrent with an asset delivery opportunity. For example, the user may elect to have content delivered free from assets or may receive content with assets and then fast-forward through and otherwise skip the assets as asset delivery opportunities occur. The utility further involves recording skip information corresponding to the asset skip event. This information may be recorded in memory of a user equipment device (e.g., for later reporting in the case of skips executed at the user equipment device) or at a network platform. It will thus be appreciated that the utility may be implemented at a user equipment device or a network platform separate from the user equipment device, or may be distributed across multiple platforms (e.g., the user equipment device and a separate network platform or platforms). The skip information can be used in network administration such as to monitor a prevalence of asset skipping, to bill customers, and/or to compensate asset providers or others based on asset skipping.

The present utility may be utilized in real-time broadcast, forward-and-store (time-shifted) and on-demand contexts. In the on-demand content, the utility may further involve transmitting the skip information to a content source of the communications network. This content source may be operative to alter delivery of the content in accordance with such skip information. For instance, a content source in the communications network (e.g., a server such as a VOD server, headend or other content device) may receive the skip information prior to transmission of the desired content and may select an asset free version of the content for transmission. Alternatively, the content source may receive skip information substantially at a time slot associated with one or more assets. The content source may then skip one or more assets associated with that time slot and resume providing the programming to the user. In this regard, assets can be selected or deselected on an a la carte basis. In such cases, the skip information or the associated skip event may be recorded by the content source or other platform within the communications network. In connection with the forward-and-store context, the relevant methodology may further include storing the content received from the communications network and at a subsequent time outputting the content to a user.

According to another aspect of the present invention, a utility is provided for use in reporting asset skipping events from a user equipment device (e.g., customer premises equipment such as a set-top box or enhanced television or portable equipment such as a wireless phone, PDA, portable hard-drive based devices or the like). The utility involves receiving content at a user equipment device from a communications network interface where the content includes programming and associated assets. This content may then be stored for subsequent consumption or played in real-time. For example, in the case of television networks, the content may be stored using a DVR. During consumption, the content is output to a user, and the consumption status of one or more assets associated with that content may be monitored, e.g., to identify fast-forwarding through an asset. In the real-time broadcast context, the system can determine, e.g., whether the asset was consumed or if the user tuned away from the asset. One or more signals indicative of the consumption status of one or more of the assets associated with the programming can then be generated. These signals may be transmitted to a platform in the communications network.

The communications network may be any network that is operable to provide content to a user via a network interface. For instance, the communications network may be a broadcast network, such as a cable television network, satellite television network or a radio network. In further arrangements, the communications network may include telephony networks, such as a landline network or a wireless network. In still another arrangement, the communications network may include a packet-switched network such as the Internet. In various different arrangements, the communications network may simultaneously provide content to multiple users or may provide content to individual users on a request basis. That is, in the latter regard, the communications network may be an on-demand network where a user may request specific content.

In any arrangement, it may be desirable that the signals indicative of the consumption status of one or more assets be provided to a network platform such that, for example, asset providers may be compensated and/or non-consuming users may be billed or otherwise disadvantaged in relation to at least some portion of the value of the non-consumed assets. Such signals may be transmitted via the same communication interface over which the content was received. Alternatively, separate communications pathways may be utilized.

According to another aspect of the invention, a utility is provided for use in monitoring asset skip inputs entered during playing content at a user equipment device. The utility includes outputting content to a user of a communications network that includes programming and assets. Such assets are typically interleaved with the programming, e.g., inserted into breaks in the programming. One or more skip-inputs may be received from the user that is associated with one or more asset delivery opportunities in the programming. Such skip-inputs may include fast-forward inputs as well as skip-forward inputs from the user, tuning away inputs, a selection input from the user indicating a selection to receive delivery of programming free from assets, or any other suitable skip-input. Consumption information associated with the skip-input(s) may be recorded. Finally, such consumption information may be transmitted to a platform in the communications network.

Consumption information may be recorded on a spot-by-spot basis where each spot is an asset delivery opportunity, e.g., an ad time slot within a commercial break on a given channel of a cable television network. Each such spot may be associated with one or more assets associated with corresponding skip inputs. Resulting records may be transmitted individually to the platform or skip information for a number of skip inputs may be stored and transmitted together to the platform of the communications network. For instance, a user equipment device (e.g., a customer premises equipment device—CPE) of a communications network may record skip information from the user associated with consumption or non-consumption of various assets over a predetermined period of time. The CPE may then report consumption status for that time period at a subsequent and/or predetermined time.

According to another aspect of the invention, a utility is provided for use in determining billing values based on information concerning the consumption or non-consumption of assets at a user equipment device. The utility involves transmitting content via a communications network to at least a first user equipment device of a network user. This content may again include programming and associated assets. One or more signals may be received from the CPE regarding the consumption status of one or more of the assets. These signals are then utilized to calculate a billing value associated with the assets.

As may be appreciated, the value of providing an asset via communications network may in some instances be computed on a per impression basis. For example, a value per network user may be calculated for the asset based on a fee or fee rate established for the asset (e.g., cost per thousand recipients—CPM) and the basis for the fee or fee rate (e.g., the number of recipients on which the fee or fee rate is based). In instances where a user elects not to consume an asset, a signal indicative of the non-consumption of that asset may be utilized to calculate the billing value for the non-consumed asset. The billing value may be the same as or different than the per-impression value. Moreover, the per-impression value may change due to delivery verification and any associated consumer classification information. This billing value may then be utilized to adjust the asset delivery cost charged to an asset provider. Alternatively, a bill may be generated to the non-consuming user that reflects a value associated with the non-delivered asset. Further, signals indicating the consumption status of one or more assets may be utilized to adjust audience size estimations for one or more assets based on a plurality of such signals. In the latter regard, it will be appreciated that multiple signals may be received from multiple users of the communications network. Further, these signals may be received at different times. For instance, where some network users utilize a forward-and-store architecture, consumption signals may be received at different times.

According to another aspect of the invention, a utility is provided for monitoring asset delivery in connection with a communications network for transmitting content to multiple user equipment devices of multiple network users. The content includes programming and associated assets, which may be interleaved with the programming. One or more signals are received from the user equipment devices regarding one or more asset skip events associated with one or more of the assets. These signals are then utilized to calculate billing information associated with the assets. The billing information may be reflected on bills for individual network users based on any assets skipped by each individual network user. Alternatively, the billing information may include an adjustment to an asset delivery cost of an asset provider.

In accordance with another aspect of the present invention, a consumer loyalty or rewards program is established based on asset consumption. An associated utility involves: establishing a rewards account for a network user; monitoring consumption of assets by the user; and crediting value to the rewards account based on monitored consumption of assets. In a preferred implementation, consumption of assets is verified based on monitoring user inputs at the user equipment device. Value may be credited to the user in any suitable form including, for example, credits towards the user's bill, credits towards service upgrades or add-ons, or credits to third party or affiliate rewards programs.

DETAILED DESCRIPTION

Figure 1:
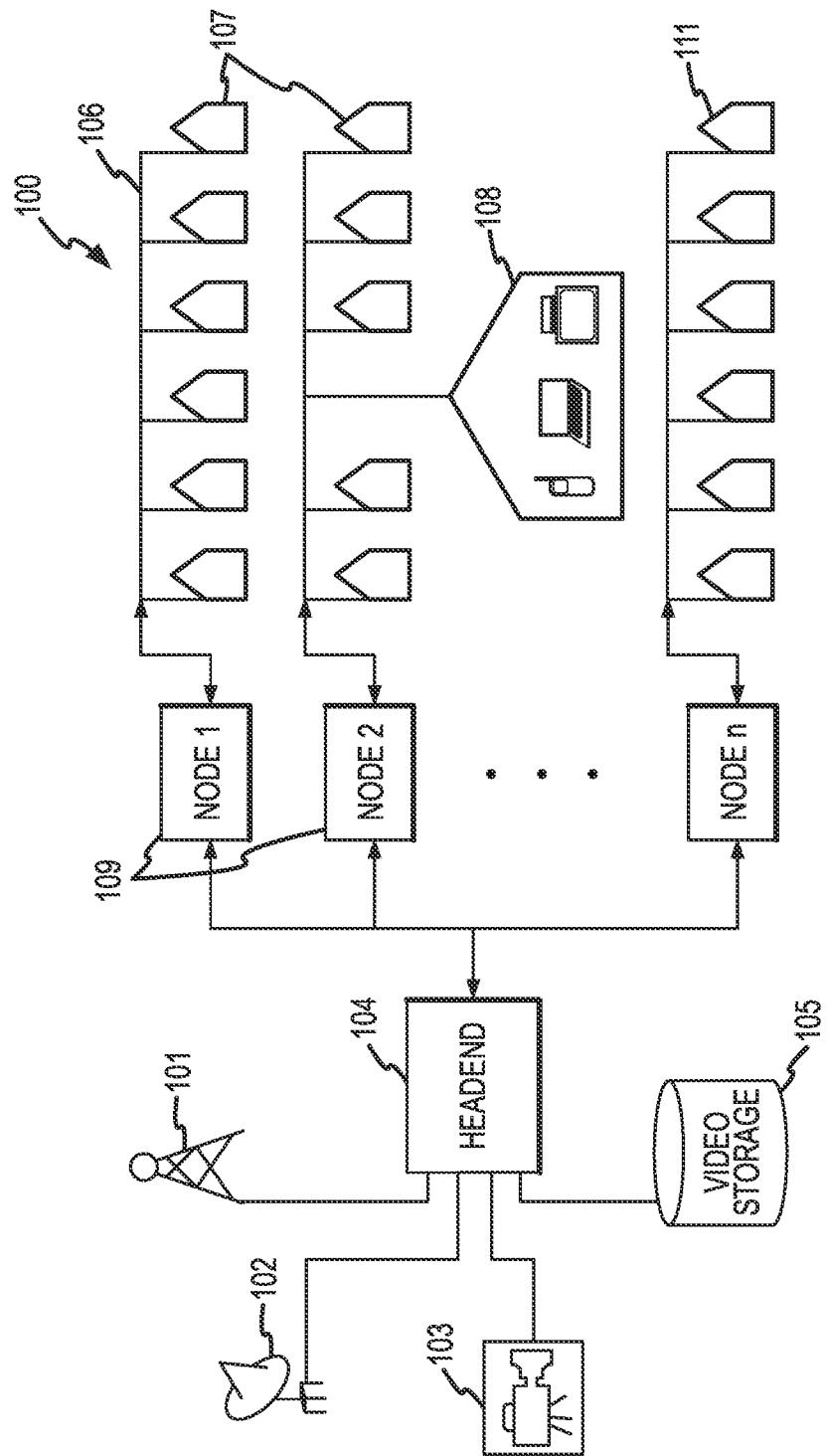
FIG. 1 illustrates major components of a cable television network.

The present invention relates to various structure and functionality for delivery of media content in a communications network, as well as associated business methods. Content may be delivered from a variety of networks including, for example, cable and satellite television networks, satellite radio networks, IP networks used for multicasting content and networks used for podcasts or telephony broadcasts/multicasts. Certain aspects of the invention make use of bi-directional communication channels that may not be readily available, for example, in connection with conventional terrestrial or satellite-based television or radio networks (i.e., such communication would involve supplemental communication systems). In various contexts, the content may be consumed in real time or stored for subsequent consumption. Thus, while specific examples are provided below in the context of a cable television network for purposes of illustration, it will be appreciated that the invention is not limited to such contexts but, rather, has application to a variety of networks and transmission modes.

As discussed above, various aspect of the present invention relate to: verifying consumption of assets; encouraging consumption of assets or discouraging skipping of assets; and accounting for the value of asset delivery in relation to verified asset consumption, which may include rich classification information regarding the household and/or the current network user. A particularly advantageous implementation of the present invention is in conjunction with a targeted advertising system for a cable television network. In this context, the asset consumption verification system can take advantage of user presence and classification information and reporting functionality that may be in place to support targeted advertising. Moreover, the targeted advertising system may be enhanced by information gathered in relation to the asset consumption verification system. Accordingly, much of the discussion below is set forth in the context of an asset consumption verification system implemented in conjunction with a targeted advertising system.

However, it will be appreciated that various aspects of the invention are not limited to this context.

In addition, it will be appreciated that consumption of assets may be tracked in relation to reporting of assets consumed or reporting of assets skipped, as well as enhanced reporting such as partial consumption, level of interest, goodness of fit, etc. For convenience, the discussion herein sometimes refers to asset "skipping" and uses similar nomenclature to identify systems and components. It will be appreciated that this is simply for convenience and does not connote a limitation in this regard.

The following description is divided into a number of sections. In the Introduction section, the broadcast network and network programming environments are first described. Thereafter, an overview of the asset delivery environment is provided including a discussion of certain shortcomings of the conventional asset delivery paradigm. The succeeding section provides an overview of an ad skip monitoring system in accordance with the present invention highlighting advantages of certain preferred implementations thereof. Finally, the last section describes individual components and exemplary implementations of the system in greater detail with specific reference to ad skip monitoring in a cable television environment.

I. Introduction

A. Broadcast Networks

One application of the present invention is in the context of networks used to provide broadcast content, herein termed broadcast networks. Such broadcast networks generally involve synchronized distribution of broadcast content to multiple users. However, it will be appreciated that certain broadcast networks are not limited to synchronously pushing content to multiple users but can also be used to deliver content to specific users, including on a user pulled basis. Examples of broadcast networks used to deliver content to specific users on a pulled basis include broadcast networks used to deliver on demand content such as VOD and podcasts. Examples of broadcast networks include cable television networks, satellite television networks, and satellite radio networks. In addition, audio, video or other content may be broadcast across Internet protocol and telephony networks. In any such networks, it is common practice to insert informational content or "assets" such as advertisements into a broadcast stream. The present invention provides a variety of functionality in this regard, as will be discussed in detail below.

For purposes of illustration, the invention is described in some instances below in the context of a cable television network implementation. Some major components of a cable television network 100 are depicted in FIG. 1. In the illustrated network 100, a headend 104 obtains broadcast content from any of a number of sources 101-103. Additionally, broadcast content may be obtained from storage media 105 such as via a video server. The illustrated sources include an antenna 101, for example, for receiving content via the airwaves, a satellite dish 102 for receiving content via satellite communications, and a fiber link 103 for receiving content directly from studios or other content sources. It will be appreciated that the illustrated sources 101-103 and 105 are provided for purposes of illustration and other sources may be utilized.

The headend 104 processes the received content for transmission to network users. Among other things, the headend 104 may be operative to amplify, convert and otherwise process the broadcast content signals as well as to combine the signals into a common cable for transmission to network users 107 or the headend 104 may be operative to process the signals to provide individual content for specific households (e.g., household 111). The headend also processes signals from users in a variety of contexts as described below. The headend 104 may thus be thought of as the control center or local control center of the cable television network 100.

Typically, there is not a direct fiber link from the headend 104 to a customer premises equipment (CPE) device 108. Rather, this connection generally involves a system of feeder cables and drop cables that define a number of system subsections or branches. This distribution network may include a number of nodes 109. The signal may be processed at these nodes 109 to insert localized content, filter the locally available channels or otherwise control the content delivered to users in the node area. In some cases, the nodes 109 may process content received from the headend 104 to generate individualized content for a specific household. The resulting content within a node area is typically distributed by optical and/or coaxial links 106 to the premises of particular users 107. Finally, the content is processed by the CPE 108, which may include a television, data terminal, a digital set top box, DVR or other terminal equipment. It will be appreciated that digital or analog signals may be involved in this regard.

B. Asset Delivery

Broadcast networks, such as described in FIG. 1, may include asset-supported and premium content channels/networks. Such programming content generally comes at a substantial cost. That is, the programming providers expect to be compensated for the programming that they provide which has generally been developed or acquired at significant cost. That compensation may be generated by asset delivery revenues, by fees paid by users for premium channels, or some combination of the two. In some cases, funding may come from another source such as public funding.

In the case of asset-supported networks, the conventional paradigm involves time slot buys. Specifically, asset providers generally identify a particular program or time-slot on a particular network where they desire their assets to be aired. The cost for the airing of the asset depends on a number of factors, but primary factors are the size of the audience for the programming in connection with which the asset is aired and the demographic composition of the audience. Thus, the standard pricing model is based on the cost per thousand viewers (CPM), where the desired demographics of those viewers may be specified. The size of the audience is generally determined based on ratings. The most common benchmark for establishing these ratings is the system of Nielsen Media Research Corporation (Nielsen). One technique used by Nielsen involves monitoring the viewing habits of a presumably statistically relevant sampling of the universe of users. Based on an analysis of the sample group, the Nielsen system can estimate what portion of the audience particular programs received and, from this, an estimated audience size for the program can be projected. More specifically, ratings may be generated for each network for each quarter hour segment. The presumption is then made that users for a program (corresponding to a quarter hour segment of a network) also consume the assets for that program. Thus, the historical performance of the particular program, for example, as estimated by the Nielsen system, may be used to set asset delivery prices for future time slots or "breaks" associated with that program.

Generally, a break may include a series of asset delivery spots and the content of a break may be determined by a number of entities. For example, some asset delivery is distributed on a basis coextensive with network programming, e.g., on a national basis. This asset delivery is conventionally scheduled based on a timed playlist. That is, the insertion of content is centrally controlled to insert assets at defined times. Accordingly, the programming and national asset delivery may be provided by the programming networks as a continuous content stream without cues for asset insertion. For example, prime-time programming on the major networks is often principally provided in this fashion.

In other cases, individual spots within a break are allocated for Regional Operations Center (ROC), affiliate, super headend or local (headend, zone) content. In these cases, a cue tone or message identifies the start of the asset delivery spot or spots (a series of assets in a break may all trigger from one cue). The cue generally occurs a few seconds before the start of the asset delivery insertion opportunity and may occur, for example, during programming or during the break (e.g., during a national ad). The ad skip monitoring system of the present invention, as will be more fully discussed herein, can be implemented at any or all levels of this hierarchy to allow for compensation with respect to national, regional and local entities.

Network operators or local network affiliates can generally schedule the non-national assets to be included within defined breaks or spots for each ad-supported channel. Conventionally, this scheduling is finalized ahead of time, typically on a daily or longer basis. The scheduled assets for a given break are then normally inserted at the headend in response to the cue tone or message in the programming stream. Typically, all assets within a break trigger from a single cue tone or message. Thus, for example, where a given break includes three spots, the scheduled asset for the first spot is inserted at a first time period after the cue, the scheduled asset for the second spot is inserted at a second time period after the cue, and the scheduled asset for the third spot is inserted at a third time period after the cue. Accordingly, prior to broadcast, the identities of the providers of the assets (e.g., national, regional and/or local) that will be provided with programming are known. Therefore, if a user elects to skip an ad spot in the programming, it may be determined which entity's ad was skipped, based on the time the spot was skipped relative to the programming and/or by identifying metadata associated with a skipped asset, as will be more fully discussed herein.

As noted, network users employ the network, and content providers and network operators derive revenue, based on delivery of desirable content or programming. The stakeholders in this regard include programming providers, asset providers such as advertisers (who may be the same as or different than the programming providers), network operators such as Multiple Systems Operators (MSOs), and users—or viewers in the case of television networks. Programming providers include, for example: networks who provide series and other programming, including on a national or international basis; local affiliates who often provide local or regional programming; studios who create and market content including movies, documentaries and the like; and a variety of other content owners or providers. Asset providers include a wide variety of manufacturers, retailers, service providers and public interest groups interested in, and generally willing to pay for, the opportunity to deliver messages to users on a local, regional, national or international level. Such assets include: conventional advertisements; tag content such as ad tags (which may include static graphic overlays, animated graphics files or even real-time video and audio) associated with the advertisements or other content; banners or other content superimposed on or otherwise overlapping programming; product placement; and other advertising mechanisms. Network operators are generally responsible for delivering content to users and otherwise operating the networks as well as for contracting with the networks and asset providers and for billing. Users are the end consumers of the content. Users may employ a variety of types of CPEs or other user equipment devices including television set top boxes, iPOD™ devices, data terminals, wireless devices, satellite delivered video or audio to an automobile and/or appliances with built-in televisions, etc.

Generally, it is assumed that all of these stakeholders have an interest in delivery of content that includes assets. For example, users can thereby have the costs of programming subsidized or wholly borne by asset providers. Asset providers are able to expose their assets to potential consumers, and network operators benefit due to the value of the network as an asset delivery mechanism. However, it will be noted that it is sometimes unclear that the interests of all of these stakeholders are aligned. For example, it may not be obvious to all users that they benefit by consuming such assets. For instance, with the recent increased use of CPEs that have significant storage capabilities (e.g., televisions including or connected to DVRs) many users prefer to store programming and consume the programming at a later time. This allows users the ability to fast-forward through or otherwise skip assets interleaved with the programming. Similarly, real-time viewers may tune away from an asset.

Such asset-skipping allows the users to consume programming substantially free of interleaved assets. However, this may affect the interests of the asset providers and the network providers. Significantly as more users store programming and can readily skip assets, asset providers may reach a smaller audience with their assets. Accordingly, asset providers may demand that network operators charge lower fees as the operators are delivering assets to an effectively smaller audience. In turn, this reduces the revenues of the network providers. This may further result in the network operators increasing user fees (e.g., monthly cable televisions costs). Thus, the non-consumption of such assets by users may result in a smaller percentage of the costs of programming being subsidized by the asset providers. However, some users may be willing to avoid consuming such assets even with an understanding of the associated costs. Conversely, verification of asset delivery may enable network operators to exact a premium for asset delivery. Moreover, some users may be willing to consume assets, and even extra assets, if they can realize some portion of the associated value.

C. Ad-Skipping Overview

This application relates generally to wireless communication systems, including techniques for radio link control (RLC) packet discarding in wireless communication systems.

In response to the increasing frequency of users skipping assets interleaved within programming and the associated diminution of return that asset providers receive on their investment, a system for encouraging asset consumption and compensating asset providers and/or network operators for skipped assets is provided. As noted above, programming is provided at considerable cost and, in the case of asset supported networks, this cost is subsidized in whole or in part by asset delivery revenues. That is, asset providers pay for the opportunity to deliver commercial impressions to users. In the context of the asset skip monitoring system described below, the value for delivery of these assets can be translated into a value per impression per asset so as to enable accounting for asset skip events.

This per impression value may be calculated in any appropriate fashion such as based on asset delivery pricing information. The asset skip monitoring system may be advantageously implemented in connection with a targeted asset system where CPEs select targeted assets for delivery and report delivery to the network. Specifically, the reporting mechanisms used for reporting what assets were delivered may be expanded to identify asset skip events. That is, the number of users receiving a particular asset (i.e., the number of commercial impressions) may be determined from information reported to the network by CPEs within the network. Such reporting of information is described in co-assigned and co-pending U.S. patent application Ser. No. 11/332,772 entitled "Monitoring a Broadcast Network" and having a filing date of Jan. 12, 2006, the entire contents of which are incorporated by reference herein. In addition to being able to determine the number of commercial impressions for a given asset, the delivery cost of each such asset is known from contract information (e.g., an agreed upon price for delivering an asset in a predetermined time slot). Accordingly, a cost per user per asset can be directly calculated. When a user skips an asset, the value to the asset provider is notionally diminished by this amount.

In the present system, asset skipping events can be detected and this information can be reported. Likewise, the injured asset provider can then be compensated for the diminished value of the delivered asset and/or the user can be billed to compensate for such asset skipping in whole or in part. For example, in the latter regard, programming may be delivered at a discount or free to users who agree to accept delivery of assets. In VOD or DVR contexts, other users may skip one or more assets, and such skipping may be reported to the network. This facilitates asset delivery support in certain contexts that have previously been limited, as a practical matter, to pay-per-view. For example, movies or near-term (e.g., next day) re-runs of network programming provided via a forward-and-store architecture may be asset supported as asset providers will have reasonable assurance that their assets have been delivered. Additionally or alternatively, consumption of assets can be encouraged through customer loyalty programs as discussed above.

The ad skip monitoring system can be implemented for programming and associated assets that are provided via a variety of distribution modes including real-time broadcast, forward-and-store and on-demand delivery such as VOD. The forward-and-store mode involves delivery of programming and assets (i.e., media content) ahead of the time at playing to CPEs with adequate storage resources, e.g., a DVR (or other storage) or data terminal. This encompasses both situations where the content is intended for forward-and-store use, e.g., where content is delivered, as bandwidth is available, and user implemented time-shifted viewing, e.g., where a DVR records regularly scheduled programming for later viewing. In the latter regard, the content is stored for later viewing, for example, as prompted by the user or controlled according to logic resident at the CPE and/or elsewhere in the communications network. The on-demand mode involves individualized delivery of media content from the network to a user, often on a pay-per-view basis. The present invention can be utilized in connection with any of these distribution modes or others. In this regard, important features of the present invention can be implemented using conventional CPEs having storage resources.

II. System Overview

Such asset skip monitoring functionality can be implemented using a variety of architectures in accordance with the present invention. For example, the asset skipping functionality can be executed at least in part at one or more network platforms remote from the user equipment device, including, for example, a DSLAM, node, headend or other platform. Such a platform may receive raw or processed click stream information from the user equipment device and identify, for example, the assets at issue, asset skipping events and user classification parameters. In this regard, the asset may be identified by determining what channels were viewed during what time periods and correlating this information to a database of what assets were inserted on what channels at what times. Skip events and user classification parameters may be determined from the click stream as described below. The platform may also access loyalty program rules, compute loyalty program values and interface with a traffic and billing system as described below.

Figure 2:
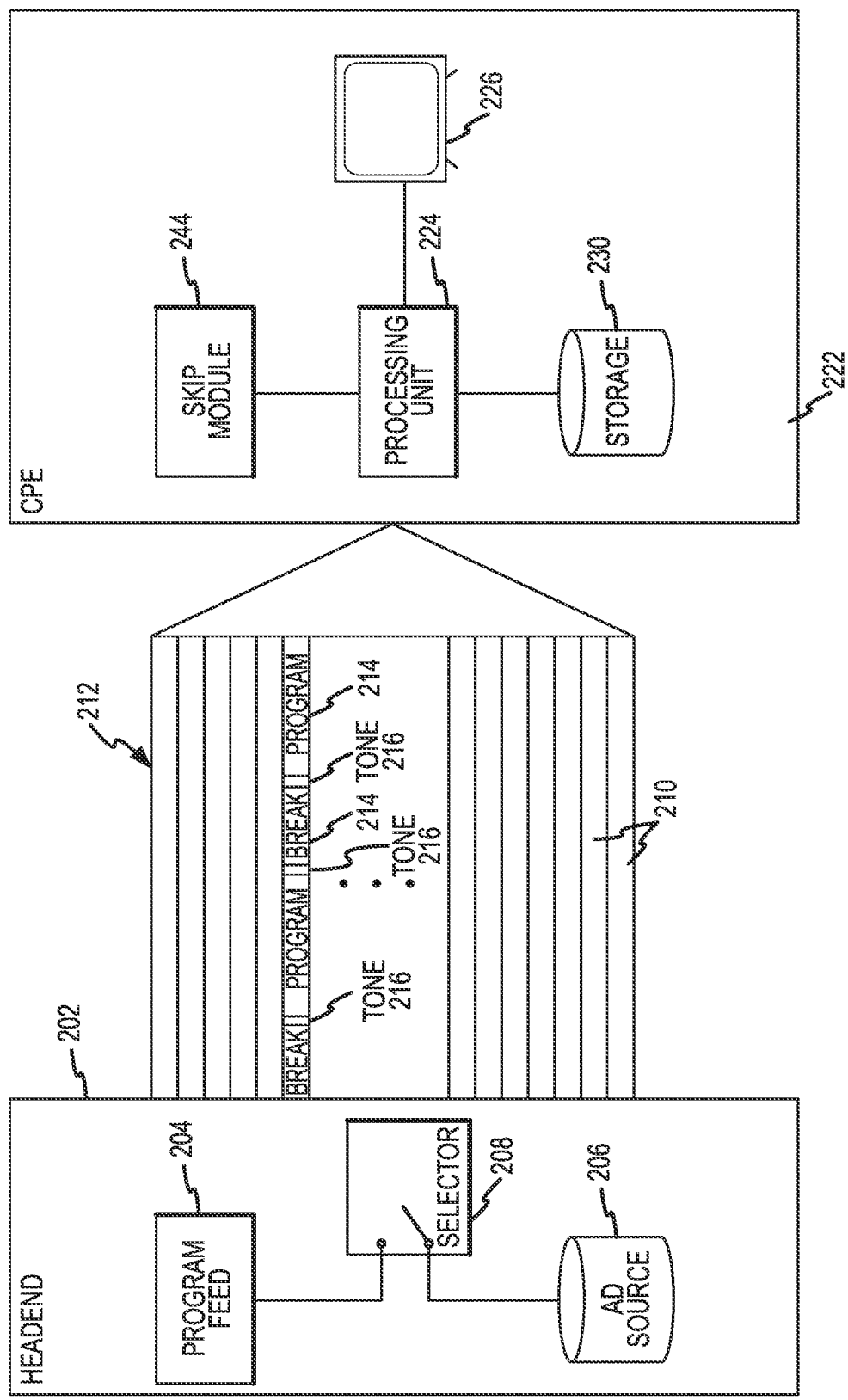
FIG. 2 illustrates assets being transmitted from a headend to a CPE device.

Alternatively, as illustrated in FIG. 2, asset skip monitoring functionality can be implemented to a significant extent at the CPEs. This may involve real-time broadcast tracking or forward-and-store functionality where content, including programming and interleaved assets, is received by CPEs from the headend and stored for subsequent consumption. In either case, any asset-skipping events can be identified and reported.

In such a system, asset insertion is generally (though not necessarily) executed at the headend. This is illustrated in FIG. 2. In the illustrated system 200, the headend 202 includes a program feed 204 and an asset source 206. As noted above, the program feed 204 may be associated with a variety of programming sources such as video storage, an antenna, satellite dish or fiber feed from a studio or the like. The asset source 206 may include a tape library or other storage system for storing pre-recorded assets. A platform associated with the headend 202—in this case, denoted a selector 208—inserts programming from the program feed 204 and assets from the asset source 206 into the video stream of an individual channel 210. This is done for each channel to define the overall content stream 212 that is distributed to subscribers (or at least to a node filter).

As illustrated in FIG. 2, the CPE 222 receives the content stream 212 that includes programming and assets from the headend 202. In the illustrated example, the content stream 212 is processed by a signal processing unit 224, which may be incorporated into a digital set-top box (DSTB), and programming is displayed on television set 226. Alternatively, or in conjunction with such displaying, the content stream 212 may be stored in a storage device 230 associated with the CPE 222 for subsequent consumption. It will be appreciated that substantial storage at the CPE 222 may be required in this regard. For example, such storage may be available in connection with certain digital video recorder (DVR) units or other storage provided with the DSTB or television set. It will be appreciated that the components associated with the CPE 222 may be embodied in a single device or in separate interconnected devices and the nature of the functionality may vary. In the case of a digital cable user, the signal processing unit 224 and other components may be incorporated into a DSTB for decoding digital signals and storing content. Such boxes are typically capable of bi-directional messaging with the headend 202. In the context of the present invention, such bi-direction messaging allows CPEs to report when an asset has been skipped (or when it has been consumed).

Figure 3:
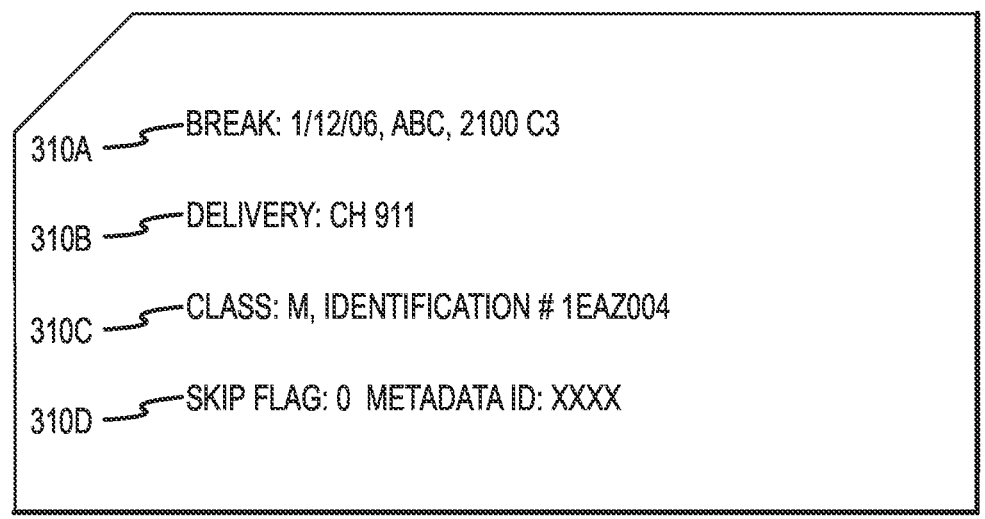
FIG. 3 illustrates information that may be included in a report file.

The illustrated CPE 224 includes an asset skip monitoring module 240. The module 240 is operative to identify asset skip events (full or partial) and to report this information to the network (e.g., the headend 202). For example, asset skip events may be identified based on monitoring a click stream from a remote control or otherwise monitoring the video stream delivered to the user. As shown in FIG. 3, appropriate information may be included in this regard in a report file 300. For purposes of illustration, the file 300 includes four types of report information 310A-D. 310A identifies the break or spot at issue. Field 310B indicates an associated programming channel (or asset channel in certain targeted asset system implementations). This information is useful to identify the relevant asset provider so that the asset provider may optionally be compensated for the asset skip. Field 310C identifies certain user classification values for the user. Finally, field 310D includes a skip flag to indicate whether or not the asset was skipped and/or metadata otherwise identifying a consumption status related to the asset. This field 310D allows for compensating asset providers and appropriately billing users in relation to asset skipping. Other information such as a goodness of fit of the user classification information to the asset targeting parameters, or simply user classification or identification information, may be provided.

Figure 4:
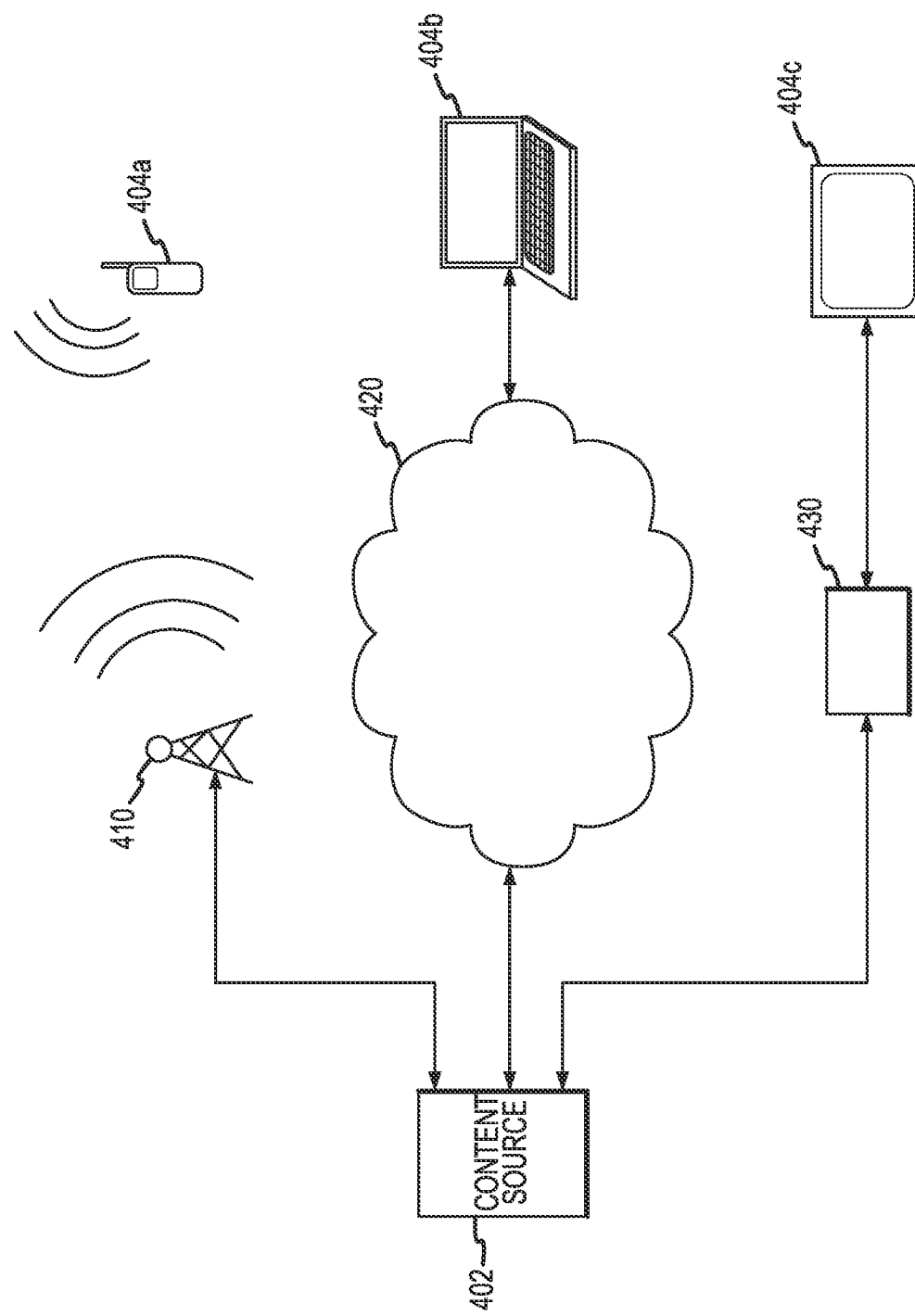
FIG. 4 illustrates the system being implemented in different communications networks.

In another arrangement, the asset skipping functionality may be implemented in an on-demand architecture. Such arrangements are illustrated in FIG. 4. In this arrangement, a content source 402 (e.g., server) provides a content stream to a user equipment device 404a, 404b and/or 404c (generally referenced as 404 below) that has requested specific programming content. The content stream may include the requested programming as well as interleaved assets, which may be combined with the programming by the content source.

As shown, the on-demand architecture may be implemented in numerous communication environments. For instance, content may be provided in a wireless telephony network where a wireless device 404a is capable of two-way communications with the content source 402. The on-demand architecture may also be implemented in a packet switched architecture where content is provided to a device 404b via a packet switched network 420 such as the Internet and/or Worldwide Web. Likewise, the on-demand architecture may be implemented on a broadcast network 430.

In any case, the device 404 receives the content stream, which may be decoded as necessary, and output to the user. In conjunction with generating the output for the user, the device 404 may monitor for inputs from the user. Specifically, the device 404 or another platform may monitor for inputs before and/or during transmission of the content to the device 404. For example, a user may select, ahead of time, to have the content transmitted free from assets. Alternatively, during content delivery, the CPE 404 or another platform may monitor for skip inputs from the user. As may be appreciated, such skip inputs may include fast-forward inputs and/or time-skip inputs (e.g., skip forward 30 seconds). The device 404 may deliver such inputs to the content source 402. The content source 402 may then adjust the content stream in accordance with the instructions received from the device 404. In conjunction with such adjustment of the content stream, the content source 402 may record that a skip input corresponds with one or more assets within the content stream. That is, the content source 402 may be operative to correlate skip inputs received from a user to assets within the content stream such that asset skip events (full or partial) may be identified. Accordingly, a record of assets skipped by the user may be generated such that an asset provider may be compensated for the asset skip and/or the user may be billed for such asset skipping.

The forward-and-store implementation of the present invention involves the transmission of content streams having programming and interleaved assets where the content stream(s) are stored at the user equipment device. In this implementation, the device may be utilized to elect which, if any, of the assets the user will consume while consuming the programming. Existing DSTBs can be configured to execute logic for implementing the system described below by downloading and/or preloading appropriate logic. In conjunction with the discussion above in relation to FIGS. 2 and 3, it will be appreciated that the asset skip monitoring functionality may be fully integrated with a traffic and billing (T&B) platform. The T&B platform allows asset providers to select slots for their assets and handles billing for delivery of those assets and, in the present embodiment, adjustment of such billing.

Figure 5:
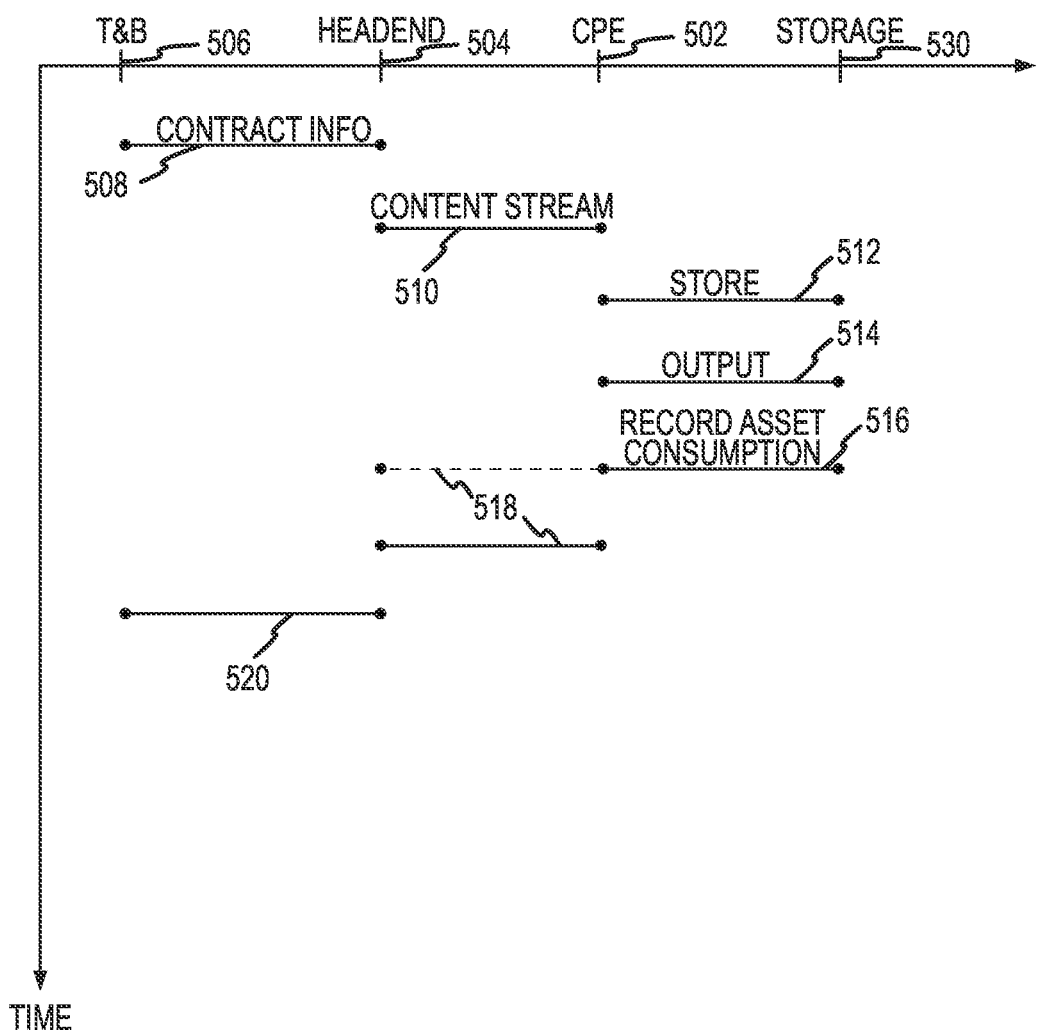
FIG. 5 illustrates a messaging sequence between a CPE, a network platform, and a traffic and billing (T&B) system.

An associated process is illustrated in FIG. 5. The illustrated process begins by loading contract information 508 from the traffic and billing (T&B) system 506 onto the headend 504. An interface associated with the T&B system 506 allows asset providers to execute contracts for dissemination of assets based on time-slot buys (for a given program or given time on a given network) and/or based on certain audience classification information (e.g., desired demographics, psychographics, geography, and/or audience size). The system 506 uses this information to compile the contract information 508, which is used to determine a time slot in which the asset is to be delivered.

The illustrated headend 504 uses the contract information together with a schedule of breaks for individual networks to generate a content stream 510 on a channel-by-channel basis. That is, the content stream includes programming and interleaved assets that are available for a given programming channel together with associated metadata identifying the interleaved assets. The user equipment device, such as CPE 502, receives the content stream 510 that includes programming, assets and associated metadata. The CPE 502 may then store 512 a portion of the content stream in a storage device 530 for subsequent consumption. The stored content stream may be indexed to its original broadcast time. During such subsequent consumption/outputting 514, a user may select, e.g. on an asset-by-asset basis, which assets, if any, to view. That is, a user may skip assets when the programming is viewed. The metadata associated with each of the skipped assets may be indexed to the original broadcast time and channel and recorded 516 for subsequent or immediate reporting 518 to the headend 504.

In the case of real-time broadcast viewing, the CPE monitors a click stream to identify an asset skip event such as tuning away from an asset (e.g., channel surfing during a commercial break) and report consumption or skipping information. For example, in connection with the targeted asset delivery system of the above-noted U.S. patent application Ser. No. 11/332,772, the asset selected, for a spot where targeting is supported, is reported, for example, by identifying the asset channel selected by the CPE for that spot. In the context of the present invention, such a report may also include a verification that the asset was fully delivered or an indication that the asset was skipped or partially skipped. Such reports may also include presence, goodness of fit and level of interest information.

The illustrated process implements a reporting system by which the individual CPEs 502 report back to the headend 504 what asset(s) (e.g., identified by metadata) were skipped by the CPE 502. The reports will typically indicate where (on what programming or asset channel) the asset was available and how much (if any) of the asset was consumed. For instance, the CPE may return metadata associated with skipped assets such that the headend 504 can tally, for example, the number of times a particular ad was skipped by multiple CPEs. Such reports 518 may be provided by all participating CPEs 502 (to enable billing of customers for skipping) or a sampling thereof. These reports 518 may be generated periodically to allow users who store content for subsequent consumption to have an opportunity to consume the programming and/or assets. For instance, it may be desirable to collect reports for an extended period after programming is originally broadcast (e.g., 10 days) to allow a majority of forward-and-store users to view the stored content. In any case, upon consuming the content or at a selected time thereafter, a report may be generated and provided to the network. The CPEs may be controlled as to when reports are generated so as to spread the reports over time and/or to provide reports when bandwidth is most available.

The reports 518 can be provided 520 from the headend 504 to the T&B system 506, for example, in raw or aggregated form. For example, the reports can be used by the T&B system 506 to determine how large an audience received the content and/or how many users skipped assets within the content. This information may in turn be provided to the asset provider(s), at least in an aggregated form. In this manner, the network operator can bill based on delivery of a particular asset or scale the billing rate (increase or decrease) based on actual delivery. In addition, the T&B system 506 may calculate a per impression value for each asset based on, for example, the contract price and the size of the delivery audience. Accordingly, a bill may be generated for each individual CPE based on the assets skipped by the CPE and the value of those assets. Accordingly, this bill may be delivered to the user of the CPE.

A processor associated with the headend, the T & B system or other system can monitor asset consumption or skipping on a per subscriber (household and/or individual viewer) basis to execute consumer loyalty or rewards program logic. For example, the processor may establish rewards accounts for each subscriber and track asset consumption in relation to such accounts. Such rewards may be administered by an MSO or other network provider based on the number and/or value of assets consumed. Additionally or alternatively, asset consumption information may be processed by such a processor, or forwarded to an external system for processing, in relation to a third party or affiliate rewards program. For example, this may be administered by an asset provider, a programming provider (e.g., a programming network), or a third party (a frequent flyer program, UPromise, etc.). Subscribers may elect, i.e., opt-in, to such a program or membership may be automatic. Members may also provide demographic or other information (including, for example, an email or other contact information) in connection with the rewards program. Such information may be fed to the targeted asset delivery system to improve targeting.

It will thus be appreciated that the present invention allows a network operator such as an MSO to sell asset delivery under the conventional asset delivery (time-slot) buy paradigm, or other targeted advertising paradigms, while allowing for adjustment of the billing to the asset provider based on the skipping of assets by users, as well as allowing an end user the option to receive or not receive the assets.

In accordance with the present invention, modified ratings may be generated based on reports to reflect not only how large (and what composition) an audience the assets were made available to, but also how large (and what composition) an audience actually consumed each asset. These latter ratings reflect users who receive the programming channel but elect to skip assets embedded therein. For example, the billing rate may be established in advance based on previous rating information for the program in question, or the best available ratings information for the particular airing of the program may be used to bill the asset provider. The billing rate may subsequently factor in forward-and-store users that skip the embedded assets. Alternatively, the initial billing rate may be based on verified consumption and therefore presumably include a premium in relation to unverified delivery.

III. Component Overview

As noted above, various system architectures are possible, for example, involving processing the user inputs or click stream at any convenient location including at the CPE or another location such as at or near a DSLAM or the headend. Implementing the ad skip monitoring system involves having CPEs report which assets were delivered to the user(s) and/or which assets were skipped (i.e., asset consumption). Accordingly, billing information based on actual delivery or non-delivery of assets can be generated by way of a CPE reporting process. As described below, the present invention provides an appropriate reporting process in this regard and provides a mechanism for using such report information to enable billing based on non-delivery of assets. In addition to improving the quality of billing information and information available for analysis of asset effectiveness and return on investment, this reporting information may in some instances provide (in some reporting implementations) audience measurement information. Accordingly, such information may allow for generating improved ratings and share data. For example, such data may be licensed to networks or ratings measurement entities. Thus, for example, if a given program such as a daytime or late night program is found to have a high skip rate, such information can be used by advertisers and network providers in decision making.

Figure 6:
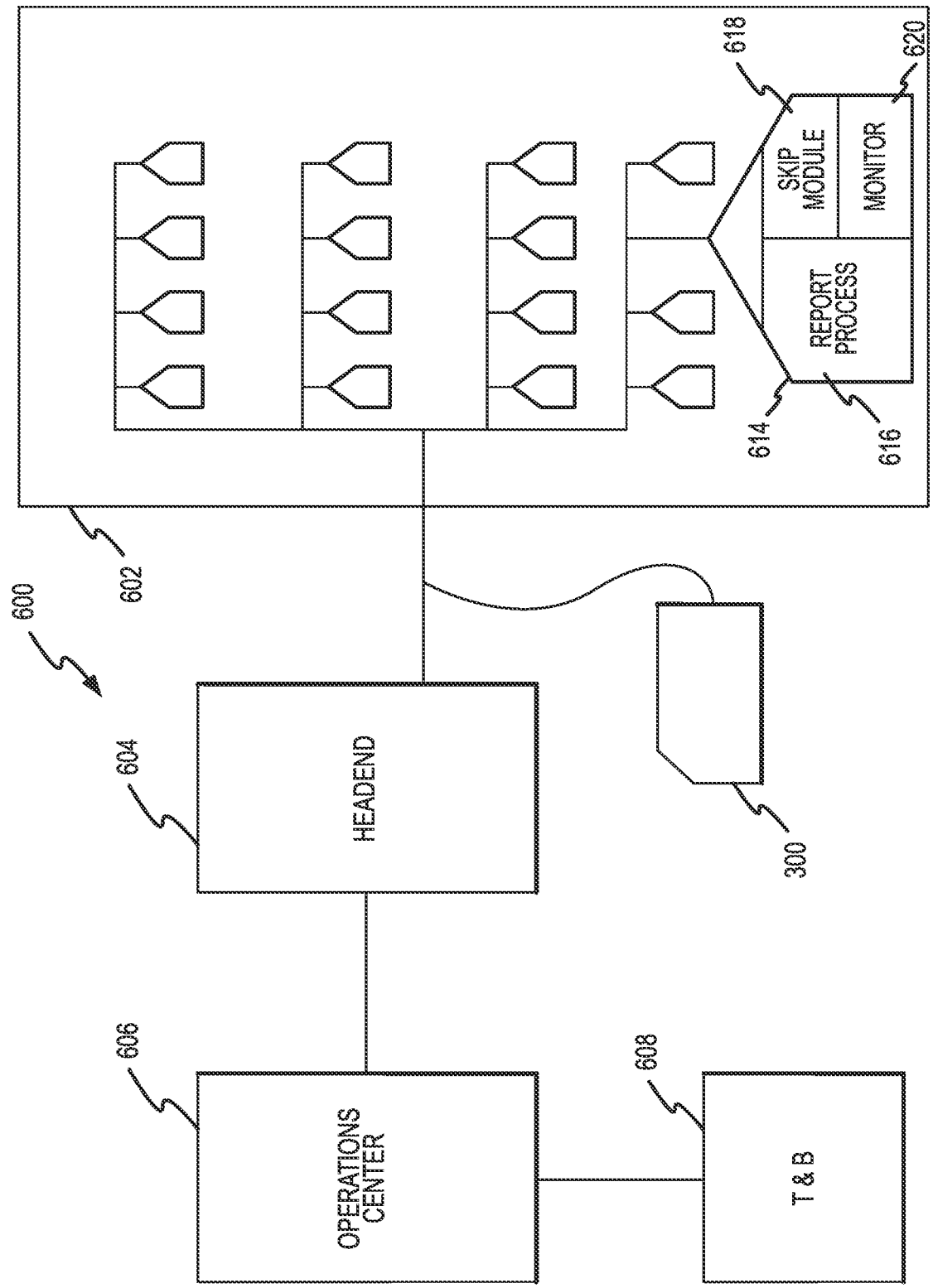
FIG. 6 illustrates a reporting system.

FIG. 6 illustrates a reporting system 600 in accordance with the present invention. The reporting system 600 is operative to allow one or more participating users, generally identified by reference numeral 602, to report asset consumption. In the illustrated implementation, such report information is transmitted to a network platform such as a headend 604. The report information may be further processed by an operations center 606 and a traffic and billing system 608.

More specifically, report information is generated by individual CPEs 614, each of which includes a report processing module 616 and an asset skip module 618. Metadata disseminated with or in advance of these assets may be utilized to report which assets were delivered and/or which assets were skipped. That is, the report-processing module 616 is operative to report to the headend 604 information regarding assets actually delivered and, in some implementations, assets that were skipped by the user. Accordingly, in such implementations, the report-processing module 616 receives asset skip information from asset skip module. This information is used to populate various fields of a report file.

In one implementation of the present invention, the reporting system 600 may operate in a standard mode or an exposed mode. In the standard mode, the transmitted report file 612 is substantially free of any sensitive information. However, the file 612 will typically include an identification code for the user, e.g., in its header field. This identification code and any other information that may be deemed sensitive from a privacy perspective may be hashed as an early step in report processing to protect user privacy as the report is transferred across the network.

In the exposed mode, a report file 610 may include more information including sensitive information. For example, information such as name, age, gender, income and the like for a user may be included in the file 610. In this regard, various levels of exposed mode may be defined corresponding to various levels of allowed potentially sensitive information. This information may be useful, for example, for comparison with estimated values to monitor system performance and to diagnose errors. It will be appreciated that operation in the exposed mode may be limited to a small number of users who have consented to inclusion of potentially sensitive information in report files. In this regard, there may be individual control of participation in exposed mode operation (and at what level of exposed mode) at the CPE level.

The report files pass through the headend 604 and are processed by an operations center 606. The operations center 606 is operative to perform a number of functions including processing report information for submission to billing. The operations center 606 then forwards the processed report information to the traffic and billing system 608. The traffic and billing system 608 uses the processed report information to, inter alia, provide measurement information to asset providers with respect to delivered assets, to assign appropriate billing values for delivered assets, and to estimate the target universe in connection with developing new asset delivery contracts. Further, the traffic and billing system 608 is operative to bill users for asset-skip events.

That is, asset-skipping events can be detected and this information can be reported. The relevant asset provider and/or network provider can then be compensated for this diminution in value and/or the user can be billed to compensate for such asset skipping.

In this regard, the illustrated system 600 utilizes the asset skip module 618 to identify asset skip events (full or partial) and to report this information to the network. For example, asset skip events may be identified based on monitoring a click stream from a remote control or otherwise monitoring the video stream delivered to the user. As discussed in relation to FIG. 3, appropriate information may be included in this regard in a report file.

Figure 7:
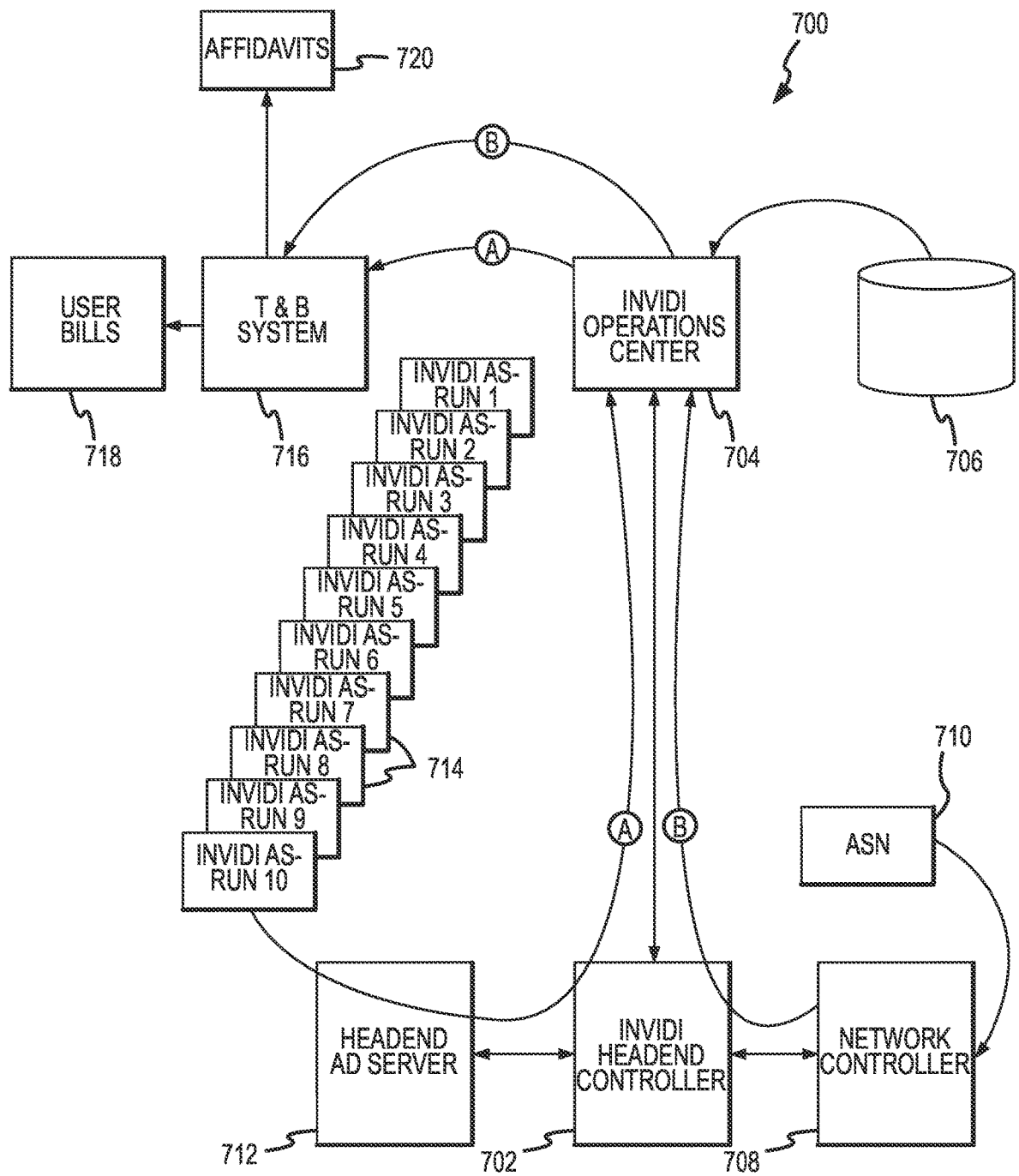
FIG. 7 illustrates various network components of a reporting system and their connections to other functional components of the billing system.

FIG. 7 illustrates the various network components of a reporting system 700, as well as their connection to other functional components of the overall system. The illustrated system includes a headend controller 702, an operations center 704 and a T&B system 716. In conventional networks without asset skipping functionality, the traffic and billing system generally serves a number of functions. Among these, a trafficking function involves order entry and assigning assets to spots. In this regard, an asset delivery schedule is built such that the headend knows to insert a particular asset upon receiving an identified cue. Another function relates to billing. When the headend inserts an asset, it generates an as run log. These as run logs are used by the traffic and billing system to generate affidavits verifying delivery of the assets for purposes of billing.

In the case of a system incorporating ad-skipping functionality, this is somewhat more complicated. With regard to billing, it is desired to provide the T&B system 716 with information analogous to the conventional as run logs plus report information detailing non-consumed assets, which originates from the CPEs. Moreover, knowledge of which assets were not consumed in connection with what programming channel generally requires: 1) a report from the CPE indicating what programming channel was employed for a given spot; 2) what asset was inserted for that spot; and 3) an indicator of an asset skip event for that spot.

The illustrated headend controller 702 generates as-run logs 714 for all channels identifying the assets that have been transmitted via the channels. Thus, in step A of the illustrated system 700, the as-run logs 714 from the headend controller 702 are processed by the operations center 704. This processing provides a network based accounting for use by the T&B system 716 of all assets that were inserted by the asset server 712 on the channels. In step B of the illustrated system 700, report information is processed. Specifically, an Asset Skip Notification (ASN) 710, including report information, is obtained in connection with each asset skip event monitored by the CPEs. This information identifies at least the spot or break and the asset or asset channel selected. As noted above, all participating digital set top boxes can be configured to return ASNs.

The as run logs 714 together with the ASNs 710 provide a clear picture of what assets were distributed with respect to each programming channel and how many digital set top boxes actually delivered the assets. This information can be used to generate affidavits 720 verifying actual asset delivery. Specifically, the T&B system 716 may adjust audience estimate values associated with the as run logs 714 based on the ASNs. That is, audience estimate values for a given asset may be reduced by the number of users who elect not to consume the asset. This allows for billing asset providers based on actual delivery of targeted impressions. In addition, the T&B system 716 may utilize the ASNs to generate user bills 718. Such bills may be generated for users who elect to skip assets while consuming programming. To generate such bills, the T&B system 716 may re-has an identification code associated with each ASN in order to bill the user associated with a given asset skip event.

Figure 8:
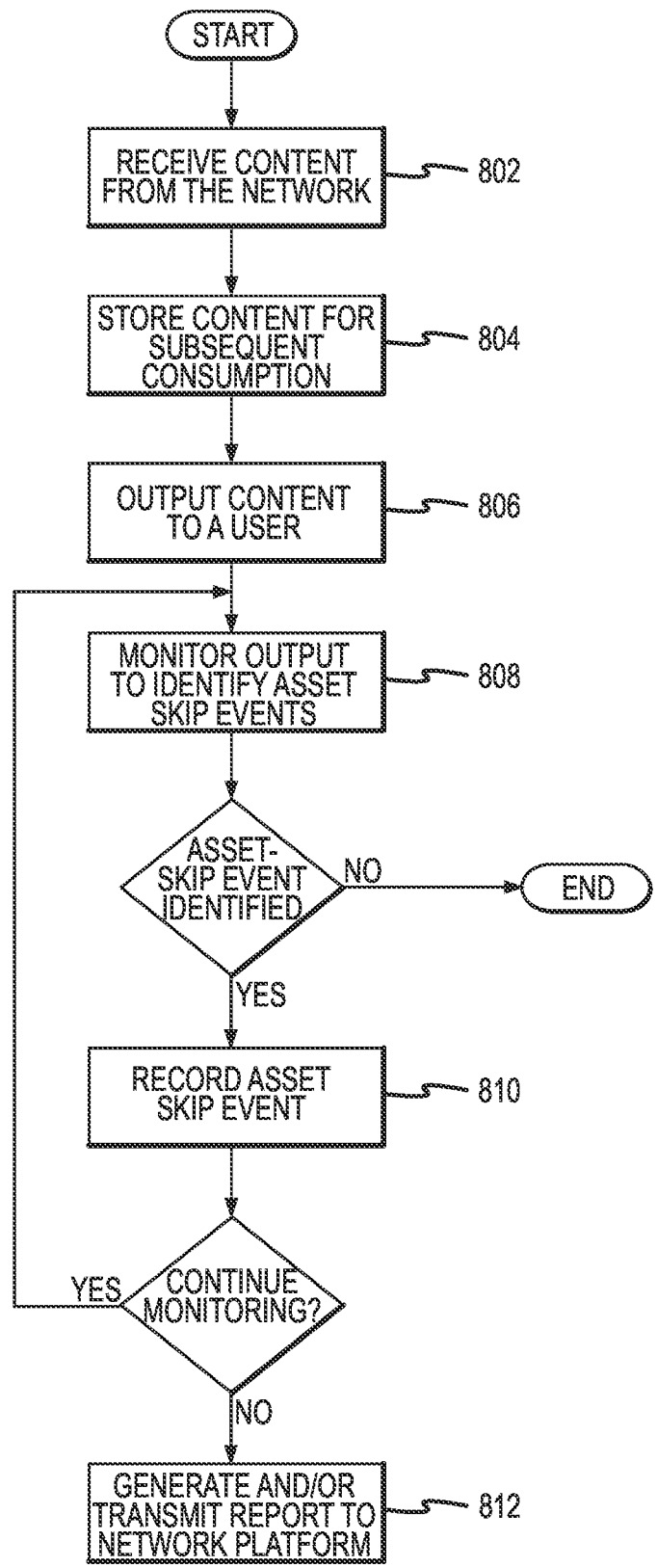
FIG. 8 illustrates a customer premises side process for implementing reporting functionality.

FIG. 8 generally illustrates a customer premises side process 800 for implementing the asset-skip reporting functionality. Initially, content is received (802) from a communications network interface by a customer premise equipment device where the content includes programming and associated assets. In the present arrangement, this may entail receiving broadcast content from a headend in a cable network. This content may be stored (804) for subsequent consumption by a user. At a subsequent time, the content may be output (806) to a user. During such outputting, the system may be operative to monitor (808) the consumption status of the assets associated with the programming. For instance, the system may monitor (808) the output of the content to identify one or more assets-skip events that may be associated with one or more programming breaks in the content. If no asset-skip events are identified at the end of the content output, the process may end. If an asset-skip event is identified, the event may be recorded (810). A determination may then be made as to whether to continue monitoring. Once monitoring is completed, a report indicative of any asset-skip events may be generated and transmitted (812) to a platform within the network.

Figure 9:
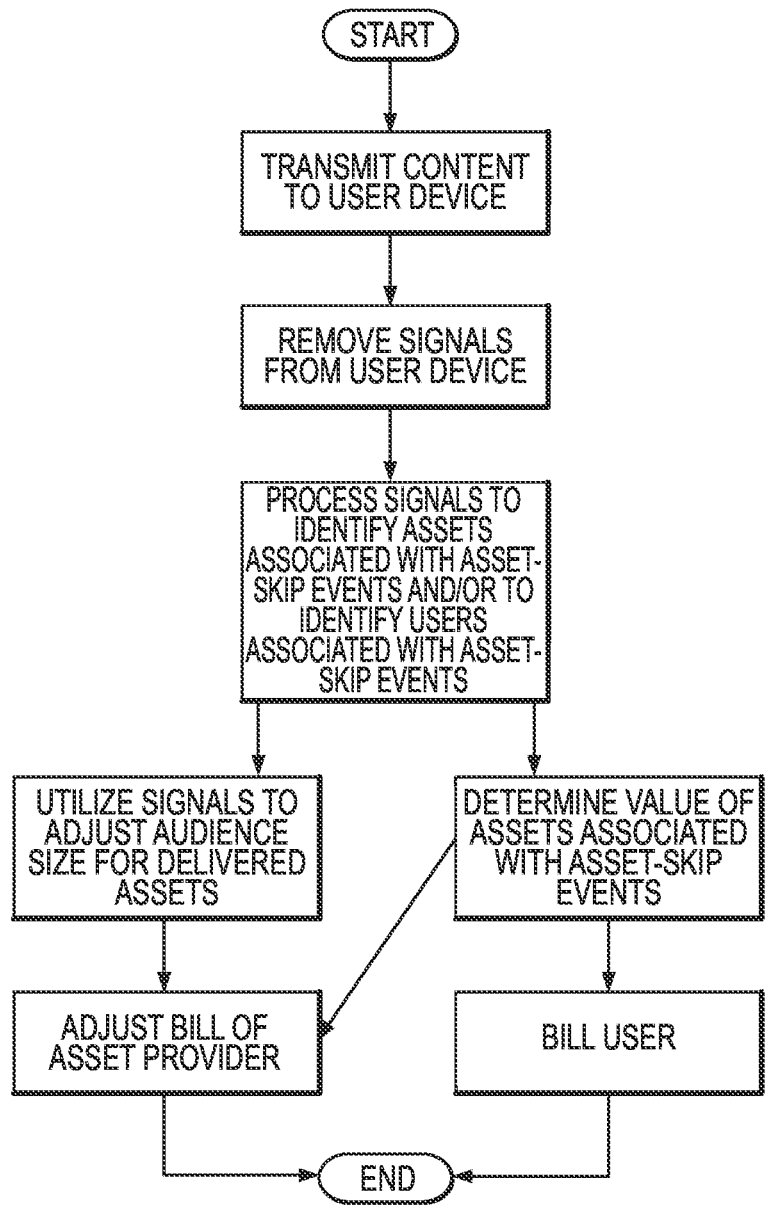
FIG. 9 illustrates a network side process for implementing reporting functionality.

FIG. 9 illustrates a network side process 900 in connection with the reporting functionality. Initially, content is transmitted (902) via a communications network to least a first customer equipment device. Again, such content will typically include programming and interleaved assets. The customer equipment device may include customer premise equipment devices as well as mobile devices. At a time after initiating transmittal of the content, signals may be received (904) from the customer equipment device. The signals may be processed (906) to identify at least a first asset identified with a skip-event and, in one arrangement, to identify a user associated with the skip-event. The resulting processed information may be utilized for separate yet interrelated purposes. For instance, a value for each skipped asset may be determined (908). Accordingly, this value may be utilized to adjust (912) the bill of an injured asset provider and/or to bill a user associated with the asset-skip event. In the latter regard, an account of a user may be billed for multiple asset skip events and a single bill may be issued periodically (e.g., monthly). Alternatively, the processed information may be utilized to adjust (910) an audience size estimate for individual assets. Accordingly, this adjustment of audience size may also or alternatively be utilized to adjust (912) the bill of the injured asset provider.

Figure 10:
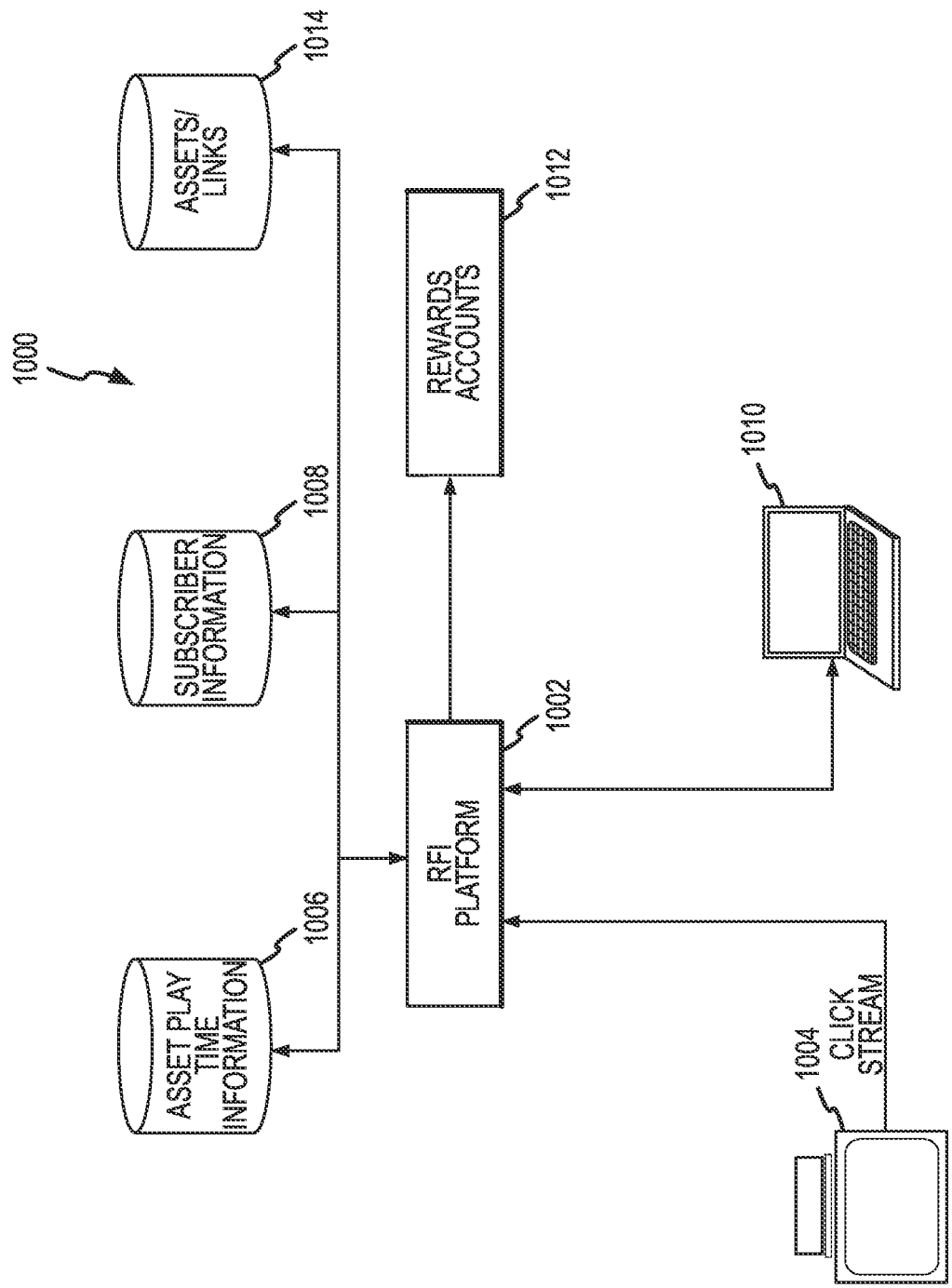
FIG. 10 illustrates a Request for Information system in accordance with the present invention.

FIG. 10 illustrates a request for information (RFI) system 1000 in accordance with the present invention. The system allows users of one communications network (e.g., a cable television network or a data network, e.g., the internet) to provide information useful for targeting assets in another network (e.g., a data network or cable television network). Thus, for example, information regarding viewing habits or classification parameters developed in connection with a cable television targeted advertising system may be used to target banner ads, or other assets, during an internet session of an associated network user. Conversely, information developed from analyzing internet usage may be utilized to target assets via the cable television network. In particular, it has been recognized that some network users have different usage modes associated with different networks. For example, when watching television, a user may prefer that interactive requirements and interruptions to programming be kept at a minimum. The same user may be interested in actively electing information, and delving deeper into available content during a data network session. An asset provider may wish to take advantage of both modes, for example, by providing a rich and alluring video asset (e.g., a computer, a PDA, a data enabled phone, etc.) via television followed by more detailed product information in an interactive context during a subsequent data network session.

Such a strategy may be particularly effective and inoffensive where the user has expressly indicated an interest in receiving the follow-on information. The system 1000 of FIG. 10 shows one architecture for executing this functionality. The system 1000 includes an RFI platform 1002 in communication with a user equipment device 1004 of a cable television network and a data terminal 1010. It will be appreciated that, although a single platform 1002 is shown for purposes of illustration, the associated functionality may be distributed over multiple platforms. Moreover, though a single deice 1004 and a single terminal 1010 are shown, the platform can service many devices and terminals within a network environment.

In addition, though the system 1000 is described below in relation to a common user of the single device 1002 and the single terminal 1010, it will be appreciated that a variety of usage patterns are possible. For example, the device 1004 may be used by multiple members of a household. Those household members may or may not also be users of the terminal 1010. In some cases, multiple household members who use the device 1002 (concurrently or separately) may have separate terminals 1010. Conversely, multiple users of a terminal 1010 may have separate devices 1002. Also, each of the device 1004 and terminal 1010 may be associated with a set of multiple users, which sets may be the same or different. It should also be appreciated that the device 1004 and terminal 1010 may be at the same location (e.g., a residence) or different locations (e.g., one at home and the other at an office or a mobile device).

In one implementation of the present invention, a user or users of the device 1004 receive a first asset on the device 1002 and receive a second, follow-on asset via the terminal 1010. For example, the first asset may be a product placement ad or an ad presented during a commercial break. The second asset may be product information delivered by email or an emailed link to interactive content. Alternatively or additionally, the follow-on asset may be delivered to the device 1004 (e.g., to be stored for later delivery or on a dedicated asset channel), via the mail or by phone.

In the illustrated implementation, little or no input by the user may be required to initiate delivery of the second asset. For example, when the targeted advertising system reports that a particular user or users (e.g., as estimated by an audience classifier) have consumed an asset, that may prompt delivery of the second ad. Alternatively, a user watching programming including a product placement ad, watching other programming such as a weather report or history themed programming, or watching an ad during a commercial break may provide an input to request information. The input may be entered, for example, by pressing a designated remote control key. This input may be responsive to a prompt (e.g., a pop-up message or icon, indicating that information is available) or sua sponte. In this manner, the second asset may be delivered based on a single input, thus requiring minimal interaction by the user and entailing little or no interruption of the current television programming/asset. However, if desired, additional interaction can be accommodated. For example, after the user has entered an initial FRI input, the user may be prompted to enter additional information, e.g., via a menu using arrow and enter keys. Such information may include: identifying the user or users requesting the second asset or information; identifying the modality or terminal(s) for delivery of the information; identifying the information desired (e.g., where multiple items of information are associated with the time of the RFI input such as when a product placement ad occurs during travel programming; or identifying a third party or parties (e.g., from a friends and family list of consenting/participating network users) to whom the information should be sent. Many other types of inputs may be supported.

Based on such inputs, information is transmitted from the device 1004 to the platform 1002. This information may be raw click stream information or processed information (e.g., an RFI message) based on the RFI input. In either case, the platform 1002 uses this information to determine the time of the input (which may be the current time if the click stream information is concurrently transmitted to the platform 1002) and the channel to which the user was tuned at the time of the input. The platform 1002 may also process this information to determine demographic or other user classification information, or to estimate the size and/or composition of an audience to optimize future time-slot ad buys.

The platform 1002 then uses this information to access an asset play time information database 1006. This database 1002, which may be constructed using information from content providers (e.g., programming networks), network providers (e.g., MSOs), equipment (e.g., headends) and other sources, identifies what assets played on what channels at what times. The database can thus be used to associate the FRI input with a first asset to which it pertains and, optionally, to a second (presumable related) asset or asset link to be delivered to the terminal 1010. This second asset or link can then be retrieved from an asset/links database 1014. It will be appreciated that the assets/links database 1014 can be accessed based on a second asset identifier, a first asset identifier or any other suitable information. Moreover, though multiple databases are depicted, any suitable data structure including a simple database or multiple databases, on a single or multiple machines, at a single or multiple locations, can be utilized.

The subscriber information database 1008 includes various information relating to the network users. This information may include: contact information (email address, physical address, phone number, etc.); privacy information such as any consents or refusals to be contacted via specified modes, at specified times or with specified kinds of information and promotions; friends and family lists; demographic information; loyalty program information; etc. For example, an email address may be extracted from the subscriber information database in order to send the second set to the terminal 1010.

FIG. 10 also shows that information from the RFI platform 1002 may be sent to a rewards accounts platform 1012. As noted above, a rewards program may credit value to a network user based on consumption of ads. In addition, value may be credited to a rewards account in connection with receiving a second asset or sending an asset to others on the network user's friends and family list. In this regard, information reflecting such activities is reported to platform 1012 for recording purposes.

While various embodiments of the present invention have been described in detail, further modifications and adaptations of the invention may occur to those skilled in the art. However, it is to be expressly understood that such modifications and adaptations are within the spirit and scope of the present invention.

What is claimed:

1. A reporting system for reporting asset consumption, the reporting system comprising:
    an asset skip processor configured to:
        monitor a first usage of a broadcast network by a first user, including:
            verifying that a first asset was delivered by the broadcast network via a first report generated by the broadcast network, to the first user on a first user device at a first time, and that the first report did not include an indication that the first asset was skipped by the first user; and
        provide, via a packet-switched network and based on the monitored first usage at a second time different than the first time, a second asset to a second user; and
        direct a second user device to store the second asset on the second user device, wherein the second asset is adapted to enable interactive functionality via the packet-switched network.

2. The reporting system of claim 1, wherein the first and second user may be the same user or different users.

3. The reporting system of claim 2, wherein the first and second user device may be the same device or different devices.

4. The reporting system of claim 2, further comprising:
    generating a log regarding assets received by at least one of a first or second user.

5. The reporting system of claim 1, wherein the second asset is selected by the first user device for delivery to the first user based on the monitored usage.

6. The reporting system of claim 1, wherein the asset skip processor is configured to provide a first asset to a first user on the first user device along with content delivered at a first time.

7. The reporting system of claim 1, wherein the second asset is presented to the second user relative to content of the first network by accessing the stored second asset from the user device.

8. The reporting system of claim 1, further comprising monitoring a second network usage of the first network by the first user to identify a user input related to an asset skip event.

9. The reporting system of claim 8, further comprising:
    associating the user input with one or more asset delivery opportunities.

10. The reporting system of claim 9, further comprising:
    recording skip information corresponding to the asset skip event with respect to the one or more asset delivery opportunities, wherein the skip information can be used in network administration.

11. The reporting system of claim 8, wherein the step of recording comprises recording the skip information in memory of a user equipment device.

12. The reporting system of claim 8, wherein the step of recording comprises recording the skip information at a network platform separate from a user equipment device wherein the user input was entered.

13. The reporting system of claim 8, further comprising using the skip information to compensate for a diminution of an audience for one or more assets.

14. The reporting system of claim 1, wherein the first usage is used in decision making relative to another asset delivery opportunity other than an asset delivery opportunity related to the first asset.

15. The reporting system of claim 14, wherein the other asset delivery opportunity is on the first network.

16. The reporting system of claim 14, wherein the other asset delivery opportunity is on another network other than the first network.

17. The reporting system of claim 1, wherein the user device uses the first usage in network administration in relation to determination of an asset selection for another asset delivery opportunity other than an asset delivery opportunity related to the first asset.

18. The reporting system of claim 1, wherein:
    the method further comprises outputting content to a user of the first network, the content including programming and the first asset;
    the first asset is interleaved with the programming; and
    the first usage is related to the content.

19. The reporting system of claim 18, wherein the outputting comprises outputting stored content from a storage device associated with the user device.

20. The reporting system of claim 19, wherein the stored content is received via a network interface.

* * * * *